Aug. 28, 1951  C. L. LOUTHAN  2,566,029
UNDERWATER FISHING KITE
Filed March 7, 1950  2 Sheets-Sheet 1
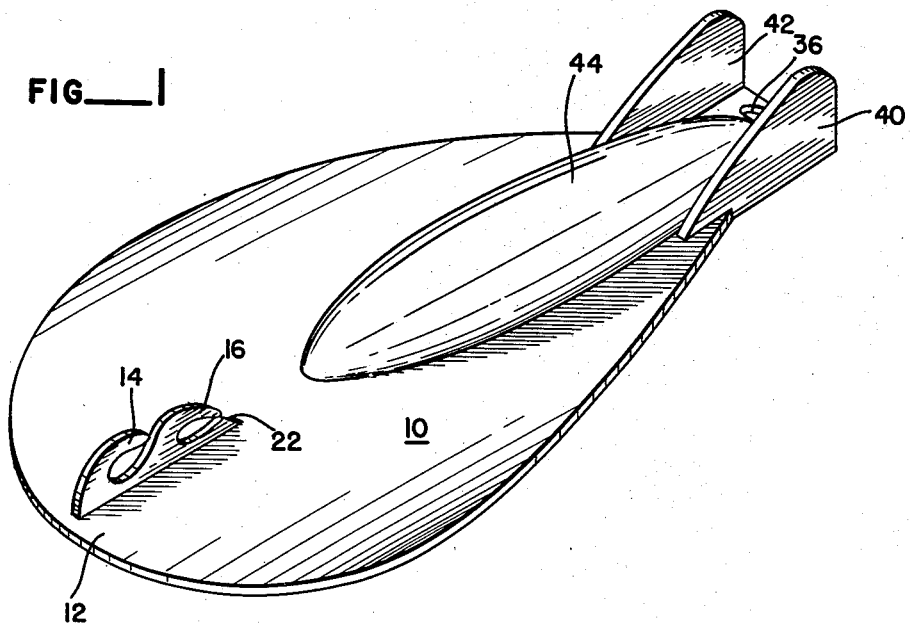
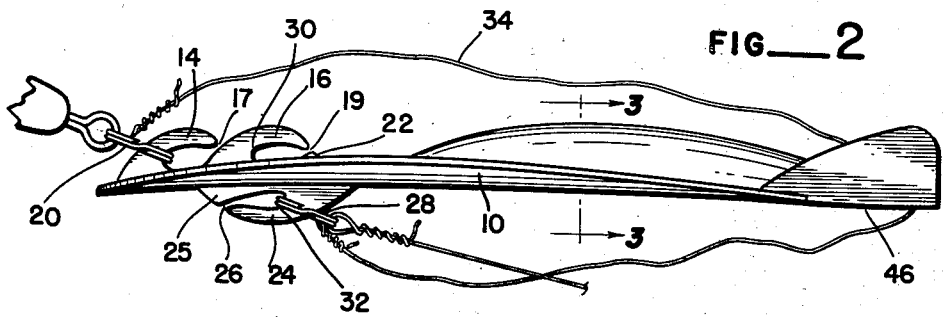
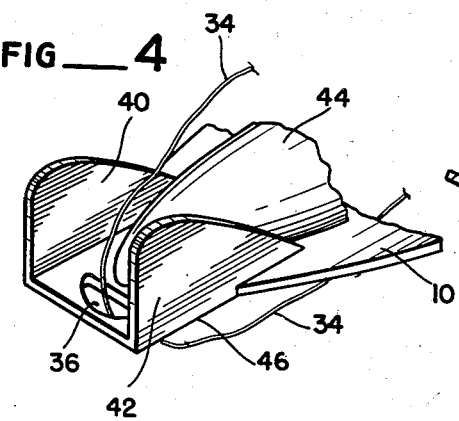
CLISSOLDE L. LOUTHAN
Inventor
By Smith & Tuck
Attorneys Aug. 28, 1951 C. L. LOUTHAN 2,566,029
UNDERWATER FISHING KITE
Filed March 7, 1950 2 Sheets-Sheet 2
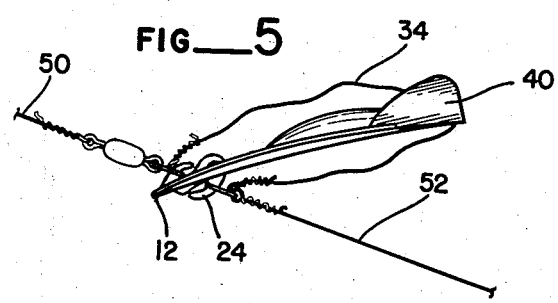
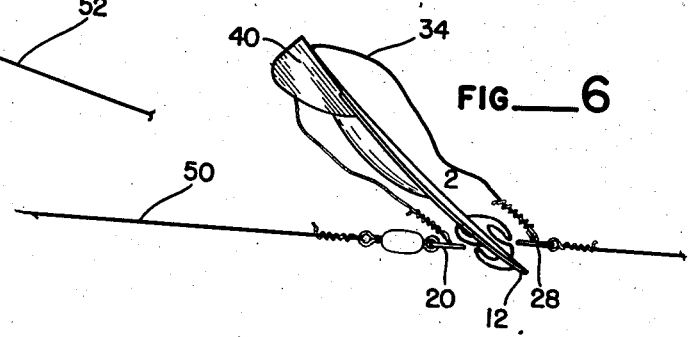
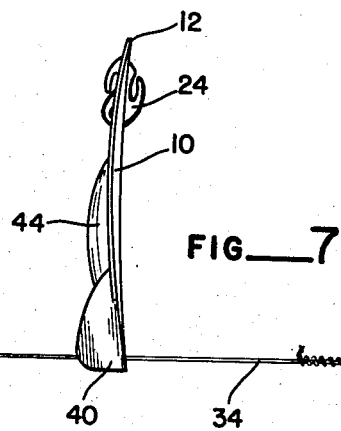
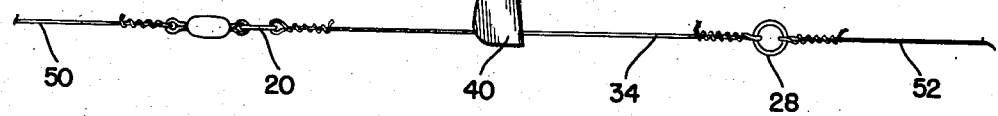
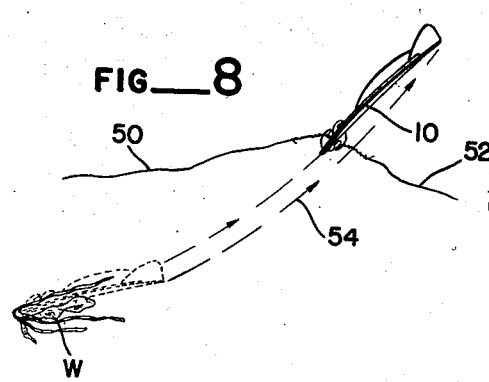
CLISSOLDE L. LOUTHAN
Inventor
By Smith & Tuck
Attorneys Patented Aug. 28, 1951

2,566,029

UNITED STATES PATENT OFFICE 2,566,029

UNDERWATER FISHING KITE

Clissolde L. Louthan, Yucaipa, Calif., assignor of one-fourth to Albert W. Bowman, Yucaipa, Calif.

Application March 7, 1950, Serial No. 148,129

6 Claims. (Cl. 43—43.13)

This present invention relates particularly to fishing tackle and, more particularly, to an under water kite, having a body with a generally egg-shaped profile, twin rudders at the rear and on opposite sides of a buoyant chamber disposed at the rear-most part of the kite. Means are also provided for threading the kite on a fishing line and engaging the towing line on the upper surface of the kite, and attaching the line leading to the fish hook or lure, to the bottom of the same, in such a manner that a fish striking the lure, up-ends the same, and so positions the kite that it no longer acts to take the lure downwardly, or in any way to seriously interfere with the playing of the hooked fish.

In fishing for those species of fish that are found at considerable depth below the surface of the water, it has been found necessary, in the past, to provide fish line weights of considerable mass, if the lure is to be carried to any depth, and more especially is this true, when most trolling is now being done from power driven boats, where the speed is substantially increased over the old rowing type of boat. The general purpose of this present invention is to make use of the well known kiting effects so that as the kite is towed through the water, the water impinges on the angularly disposed kite, and tends to force it deeper and deeper in the water. In this manner, fishing lines are taken to the desired depth without the mass of weight which has been found very objectionable in the case of the commercial fisherman. It is most objectionable in sport fishing, in that it destroys the fighting ability of the hooked fish, and thereby greatly detracts from the sport of fishing.

Many attempts have been made to solve this problem through the use of kiting devices, and reference is made to Patent No. 2,273,209 of February 17, 1942 and Patent No. 2,247,583 of July 1, 1941, secured by this present inventor. In all the various kiting devices that have been examined, including those referred to above, a great deal of skill is required on the part of the user of the gear, due to the complexity of the equipment, and the need for accurate adjustment of the same, if it is to be fished properly. In this present invention, it is believed that a very simple device has been produced, which will, with certainty, do its intended work without adjustment even when used by a novice in fishing.

The principal object of this present invention, therefore, is to provide a simple, fool-proof, kiting device for submerging fishing lures.

A further object of this invention is to provide a fishing kite for under water use, which is so arranged that when a strike occurs, the device becomes inoperative and adds but very little to the weight of the fishing gear and does not interfere with playing a game fish.

A further object of this invention is to provide a buoyant fishing kite of a character that will rise to the surface if the forward motion of the boat is stopped. This is a very desirable characteristic as it avoids entanglement or snagging on the bottom, and assists in reeling in the gear when the fishing period is over.

A further object of this invention is to provide a buoyant chamber disposed at the rear of the fishing kite, so that if weeds are picked up by the kite, the same can be displaced from it by merely slacking out on the line and the buoyant chamber will raise the kite up above the weeds, which will be dragged off the same by the arresting action of the water.

Further objects, advantages and capabilities will be apparent from the description and disclosure in the drawings, or may be comprehended or are inherent in the device.

In the drawings:

Figure 1 is a perspective view showing the top surface of this under water fishing kite;

Figure 2 is a side elevation of the kite of Figure 1, and showing broken away, the towing swivel and also showing the connecting line and the line passing to the lure, which is also broken off short;

Figure 3 is a cross-sectional view taken along the lines 3—3 of Figure 2;

Figure 4 is a fragmentary perspective view showing the rear of this fishing kite, as viewed from the top;

Figure 5 is a side elevation of the fishing kite in its normal position of use;

Figure 6 is a similar view, but showing the kite immediately after a strike has tripped the same and disconnected the towing line and the lure line from the forward portion of the kite;

Figure 7 is an elevation showing the manner in which the kite is secured to the fishing line after it has been tripped;

Figure 8 is a diagrammatic view illustrating the manner in which this fishing kite disposes of weeds or other refuse which might become lodged on the front of the kite.

Referring more particularly to the disclosure in the drawings, the numeral 10 designates the body of this fishing kite, as viewed from the top or bottom, the general form is ovate with the pointed end to the rear. Referring to Figure 3 which shows the kite in cross section, it will be noted that it is concave, as viewed from the top. Further, as viewed in Figure 2, it is to be noted that the longitudinal axis of the kite is curved upwardly at its center, with the most pronounced curve toward the leading or head end 12. On the upper surface near the leading end are preferably a plurality of pulling line attachment hooks, as 14 and 16 thus providing for either shallow or deep draft. These are formed so that the ends of these hook members have but slight clearance as at 17 and 19, that the ring 20 of the towing line will not pass through the same without springing them outwardly or sideways. It will be noted that a rib portion 22 is formed so as to give this restriction to the end of hook member 16.

Disposed on the lower or bottom surface of the fishing kite is a lure line attaching hook 24. This has a rib as 25, which serves also to provide a restricted passageway at 26, so the lure ring 28 cannot pass out of the same without considerable springing of the material. At this point it is desired to call attention to the fact that the towing surface of the rearmost hook 16, as at 30, is forward of the ring seating portion 32 of the hook 24 disposed on the bottom of the kite. This is an essential relationship in order that the kite will up-end when a strike occurs, but will not trip in normal use.

A kite securing line 34 is secured to the towing line ring 20 and to the lure ring 28, and intermediately passes through an opening 36 in the extreme rear end of the kite. This line forms a working part of the fish line after a fish has struck the lure, and by having the same pass through an opening in the kite, it insures against loss of the kite, after it has been tripped and the fish is being played.

At the extreme rear of the kite are disposed, preferably, parallel rudder members 40 and 42. It has been found desirable to employ the two, rather than a single centrally disposed one, in that it is desirable that these rudders 40 and 42 have their outer water impingement surfaces so disposed as to be in contact with, normally, unbroken water. This is particularly desirable due to the turbulence often caused by the buoyant chamber 44, which, to function practically, needs to be on the rear end of the kite and on the upper surface of the same. Buoyant chamber 44, can take, within reason, any desired form, the one shown is semi-circular in cross section and streamlined along the longitudinal axis of the kite. In the event, however, it is very desirable that the transverse extent of the buoyant chamber does not come out far enough to interfere with the outer surfaces of rudders 40 and 42. It has further been found desirable to have a portion of the rear of the kite formed as a flat plane, as at 46, so that the under side of the same will be, in effect, a horizontal rudder, and tend to break, to a degree, the smooth slip stream on the bottom surface of the kite.

Method of operation

The operation of this fishing kite will probably be best understood from a study of Figures 5, 6, 7, and 8. Figure 5 shows the towing line 50 and the general plane of the kite in a normal relationship. Under such conditions, the kite acts truly as a kite, and carries the line downwardly in the water despite the normal resistance of the line itself in passing through the water sideways, as it were, due to the normal curve of the towing line when under draft, and also to the drag of the lure or bait on the lure line 52.

In Figure 6 the kite is shown in the position it has been observed to assume when a strike has occurred on the lure line. It is under such conditions that the relationship of the curves forming hook members 14 and 16 and 24 begin to show their function. In other words, if the two rings 20 and 28 were not able to move along these curves we would not have the transition from the towing position to the trip position, shown in Figure 6. In Figure 6, it will be noted that both rings have been released from their normal hooked engagements. Normally ring 28 is removed by the strike when it occurs, and ring 20 is removed as the towing line 50 is carried forward and there is a very marked increase resistance, due to the kite being positioned so as to have its whole projected area presented to the water and momentarily anchoring the same.

Figure 7 illustrates the manner in which the kite is located on line 34, which normally was a slack connecting line between line 50 and 52, after the showing of Figures 2 and 5. The kite may assume any position around line 34. As long as there is forward movement of line 50, it has been found that normally, it will be above line 34. This is due, no doubt, to the buoyant effect of the buoyant chamber 44. In any event, however, it does not present any real resistance to the passage of the line through the water, whenever the fish is being played, and it maintains its general relationship until the fish is boated or lost, and then the kite must be reset, after the showing of Figures 2 and 5. The air or buoyant chamber 44 serves to give the kite its proper downward slope at the start of any tow so it will immediately start down. Also it greatly assists in up-ending the kite after a strike due to its ever present buoyancy which always exerts a force endeavoring to raise the rear of the kite and which must be constantly overcome by the towing force.

In Figure 8 is shown a function of the buoyant chamber that is only incidental, but which has proved to be a very desirable one, in that when debris, weeds and the like, collect on the forward end of the kite, the additional drag on the line will indicate their presence. If at that time, the boat is either stopped or a yard or two of line is quickly stripped out, then the buoyant chamber will raise the kite after the showing of the various arrows 54, and the weeds will be lost in the water due to the resistance of the water which tends to hold them while the kite rises upwardly and rearwardly and escapes them. One of the prime purposes of the buoyant chamber is to steady the kite in the water and keep it from turning bottom-side up where the desirable impingement angles would then be lost.

It is believed that it will be clearly apparent from the above description and the disclosure in the drawings, that the invention comprehends a novel construction of an under water fishing kite.

Having thus disclosed the invention, I claim:

1. In an under water fishing kite, the improvement, comprising: a body having a generally ovate shape in plan view with the reduced end to the rear, said body being thin vertically, the shape of said body in transverse cross-section being concave upward, the shape of said body in longitudinal cross-section being concave downward; said body having a buoyant air chamber positioned on the upper rear surface of said body; two vertical rudders positioned on the rear upper surface of said body, on either side of said chamber; a pulling line and a pulling line ring secured thereto; hook means, for releasably securing said pulling line ring, positioned on the forward upper surface of said body, the free end of said hook being directed backward; a lure line and a lure line ring secured thereto; hook means, for releasably securing said lure line ring, positioned on the forward lower surface of said body, to the rear of said means for securing said pulling line ring, the free end of said hook for said lure line ring, being directed forward; said body having an opening in the rear portion of said body; and a kite securing line connected at one end to said lure line and at the other end to said pulling line and running through said opening.

2. In an under water fishing kite, the improvement, comprising: a substantially flat elongated body; a buoyant member positioned on the upper rear surface of said body; vertical rudder means secured to the rear portion of said body; a pulling line and a pulling line ring secured thereto; hook means, for releasably securing said pulling line ring, positioned on the forward upper surface of said body, the free end of said hook being directed backward; a lure line and a lure line ring secured thereto; hook means, for releasably securing said lure line ring, positioned on the forward lower surface of said body, to the rear of said means for securing said pulling line ring, the free end of said hook for said lure line ring being directed forward; and a kite securing line connected at one end to said lure line and at the other end to said pulling line and connected to said body.

3. In an under water fishing kite, the improvement, comprising: a body having a generally ovate shape in plan view, said body being thin vertically, the shape of said body in transverse cross-section being concave upward, the shape of said body in longitudinal cross-section being concave downward; said body having a buoyant air chamber positioned on the rear upper portion of said body; two vertical rudders positioned on the upper surface of said body on either side of said chamber; a pulling line; releasable means, for securing said pulling line, positioned on the forward upper surface of said body; a lure line; releasable means, for securing said lure line, positioned on the forward lower surface of said body, to the rear of said means for securing said pulling line; and a kite securing line secured at one end to said lure line and at the other end to said pulling line and connected to said body; said releasable means being disposed to automatically release said pulling line and said lure line after the striking of a fish.

4. In an under water fishing kite, the improvement, comprising: a substantially flat elongated body; a buoyant member secured to the rear of said body; a pulling line; releasable means, for securing said pulling line, positioned on the forward upper surface of said body; a lure line; releasable means, for securing said lure line, positioned on the forward lower surface of said body, to the rear of said means for securing said pulling line; and a kite securing line secured at one end to said lure line and at the other end to said pulling line and connected to said body; said releasable means being disposed to automatically release said pulling line and said lure line after the striking of a fish.

5. In an under water fishing kite, the improvement, comprising: a body having buoyant means secured to the rear of said body; a pulling line; releasable means, for securing said pulling line, positioned on the forward upper surface of said body; a lure line; releasable means, for securing said lure line, positioned on the forward lower surface of said body; and a kite securing line connected at one end to said lure line and at the other end to said pulling line and connected to said body; said releasable means being disposed to automatically release said pulling line and said lure line after the striking of a fish.

6. In an underwater fishing kite, the improvement, comprising: a large thin body; a pulling line; releasable means, for securing said pulling line, positioned on the upper surface of said body; a lure line; releasable means, for securing said lure line, positioned on the lower surface of said body, to the rear of said means for securing said pulling line; a kite securing link connected at one end to said lure line and at the other end to said pulling line and connected to said body; said releasable means being disposed to automatically release said pulling line and said lure line after the striking of a fish.

CLISSOLDE L. LOUTHAN.

REFERENCES CITED

The following references are of record in the file of this patent:

UNITED STATES PATENTS

| Number | Name | Date |
| --- | --- | --- |
| 1,320,804 | Squarebriggs | Nov. 4, 1919 |
| 1,365,813 | Brown | Jan. 18, 1921 |
| 1,419,903 | Bailey | June 13, 1922 |
| 1,489,421 | Bond | Apr. 8, 1924 |
| 1,854,028 | Gruenhagen | Apr. 12, 1932 |
| 1,861,905 | Bergstedt | June 7, 1932 |
| 2,186,780 | DeWitt | Jan. 9, 1940 |
| 2,273,209 | Louthan | Feb. 17, 1942 |